United States Patent
Lin et al.

(10) Patent No.: US 10,036,484 B2
(45) Date of Patent: Jul. 31, 2018

(54) PUSHBUTTON VALVE ASSEMBLY

(71) Applicant: Fujian Xihe Sanitary Ware Technology Co., Ltd., Nan'an, Fujian (CN)

(72) Inventors: Xiaofa Lin, Nan'an (CN); Xiaoshan Lin, Nan'an (CN); Qiqiao Liu, Nan'an (CN); Xiaoqing Deng, Nan'an (CN); Jun Xu, Nan'an (CN)

(73) Assignee: Fujian Xihe Sanitary Ware Technology Co., Ltd., Nan'an (CN)

(*) Notice: Subject to any disclaimer, the term of this patent is extended or adjusted under 35 U.S.C. 154(b) by 0 days.

(21) Appl. No.: 15/124,353

(22) PCT Filed: Jul. 19, 2016

(86) PCT No.: PCT/CN2016/090467
§ 371 (c)(1),
(2) Date: Sep. 8, 2016

(87) PCT Pub. No.: WO2017/041582
PCT Pub. Date: Mar. 16, 2017

(65) Prior Publication Data
US 2018/0163893 A1 Jun. 14, 2018

(30) Foreign Application Priority Data
Sep. 8, 2015 (CN) ............ 2015 2 0689996 U

(51) Int. Cl.
*F16K 31/44* (2006.01)
*F16K 31/60* (2006.01)

(52) U.S. Cl.
CPC ............ *F16K 31/44* (2013.01); *F16K 31/60* (2013.01)

(58) Field of Classification Search
CPC .................. F16K 31/44; F16K 31/60
USPC .......................... 251/230, 319, 96
See application file for complete search history.

(56) References Cited

U.S. PATENT DOCUMENTS

| | | | | |
|---|---|---|---|---|
| 5,022,426 A | * | 6/1991 | Fischer | F16K 31/36 137/119.03 |
| 5,421,552 A | * | 6/1995 | Wang | E03C 1/052 222/179 |
| 8,276,833 B2 | * | 10/2012 | Cheng | E03C 1/0409 239/436 |

FOREIGN PATENT DOCUMENTS

CN        103423476 A    * 12/2013

OTHER PUBLICATIONS

Translation of CN103423476.*

* cited by examiner

*Primary Examiner* — Kevin Murphy
*Assistant Examiner* — Kelsey Cary

(57) ABSTRACT

A pushbutton valve assembly is provided with a body including a space; a control assembly including a pushbutton, a connection subassembly, and two ratcheting subassemblies; an activation assembly having one end secured to the pushbutton, the activation assembly disposed through the connection subassembly to have the other in the space, and the activation assembly including a ratcheting mechanism; and a biasing member anchored between the body and the activation assembly. A pressing of the pushbutton moves down the activation assembly to cause the ratcheting subassemblies to apply a ratcheting action in a downward direction, thereby rotating the activation assembly a first angle, causing the ratcheting mechanism to apply a ratcheting action in the downward direction, and compressing the biasing member. A releasing of the pushbutton rotates the activation assembly a second angle, thereby re-positioning the activation assembly and the control assembly, and increasing or decreasing flow.

8 Claims, 9 Drawing Sheets

PUSHBUTTON VALVE ASSEMBLY

BACKGROUND OF THE INVENTION

1. Field of the Invention

The invention relates to pushbutton valve assembly and more particularly to a pushbutton valve assembly.

2. Description of Related Art

Pushbutton or hand wheel based valves for regulating water flow from a water supply to a point of use are well known. A user may exert a force to push the pushbutton (or rotate the hand wheel) to open the valve. The user may exert a great force to push the pushbutton (or rotate the hand wheel) to open the valve if water pressure is great. This has the drawbacks of damaging the valve and being inappropriate for operation by children or the old.

Thus, the need for improvement still exists.

SUMMARY OF THE INVENTION

It is desirable to provide an improved pushbutton valve assembly which addresses the above described drawbacks.

It is therefore an object of the invention to provide a pushbutton valve assembly comprising a body including an inlet, an outlet, and a space between the inlet and the outlet; a control assembly including a pushbutton, a connection subassembly, and two ratcheting subassemblies; an activation assembly having a first end secured to the pushbutton, the activation assembly disposed through the connection subassembly to have a second end disposed in the space, and the activation assembly including a ratcheting mechanism; and a biasing member anchored between the body and the activation assembly; wherein a pressing of the pushbutton moves down the activation assembly to cause the ratcheting subassemblies to apply a ratcheting action in a downward direction, thereby rotating the activation assembly a first angle, causing the ratcheting mechanism to apply a ratcheting action in the downward direction, and compressing the biasing member; and wherein a releasing of the pushbutton moves up the activation assembly and rotates the activation assembly a second angle by expanding the biasing member, thereby re-positioning the activation assembly and the control assembly, and increasing or decreasing flow passing through the activation assembly.

Preferably, further comprises one ratcheting subassembly formed on the pushbutton, the other ratcheting subassembly is formed on the connection subassembly, and each ratcheting subassembly includes a plurality of spaced apart teeth of a steeply sloped edge and a gently sloped edge.

Preferably, the ratcheting mechanism includes a gear disposed in a lower ring of the connection subassembly, the gear including a plurality of spaced apart teeth of a gently sloped edge and a steeply sloped edge, and a pawl disposed in the lower ring of the connection subassembly and engaging the gear.

Preferably, the activation assembly further comprises a sealing member in the space, and a stem passing through the connection subassembly, the stem having a recess at an end secured to the pushbutton, and wherein the steeply sloped edges of the gear are formed on the stem.

Preferably, the sealing member includes a slot so that a ratcheting action is applied to both the steeply sloped edges of the gear and the pawl in response to the downward movement of the activation assembly, thereby aligning the slot with both the inlet and outlet or not.

Preferably, the sealing member further comprises a cylinder in the slot for anchoring the biasing member.

Preferably, the connection subassembly includes the lower ring and an upper ring secured to the lower ring, the other ratcheting subassembly is formed on the upper ring, and the pawl is disposed in the lower ring.

Preferably, the body further comprises an inlet port formed with the inlet and an outlet port formed with the outlet, and the activation assembly has the second end disposed in the space so that the flow is configured to flow from the inlet to the outlet through the inlet port, the space, and the outlet port.

By utilizing the invention, the following advantages are obtained: Easy operation of pushbutton. Simple construction. Reliability. Easy control. Stability. Easy installation. Total satisfaction. Meeting customer demand. The activation assembly moves downward after pressing the pushbutton and upward after releasing the pushbutton. Decreased number of components. Decreased resistance of the activation assembly. One hand operation. Large and small flows are available.

The above and other objects, features and advantages of the invention will become apparent from the following detailed description taken with the accompanying drawings.

DETAILED DESCRIPTION OF THE INVENTION

Figure 1:
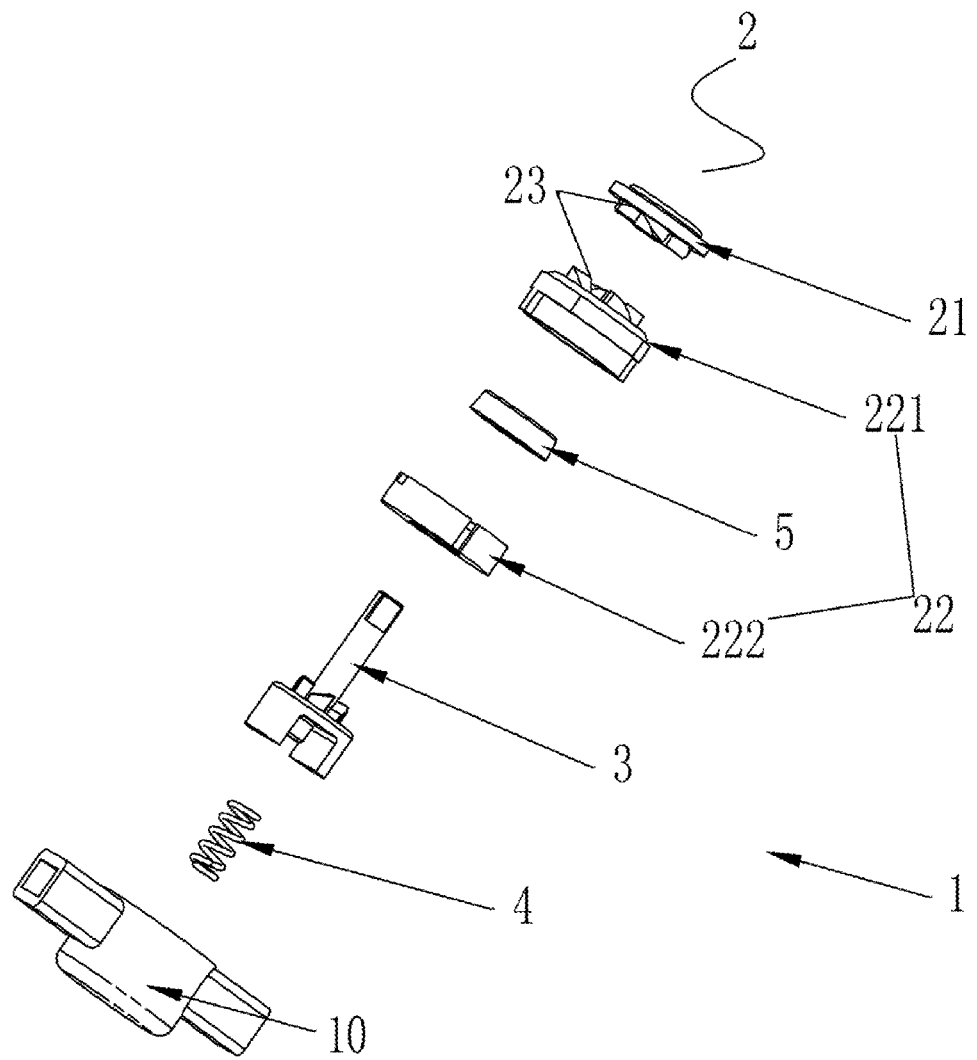
FIG. 1 is an exploded view of a pushbutton valve assembly according to the invention.
Figure 2:
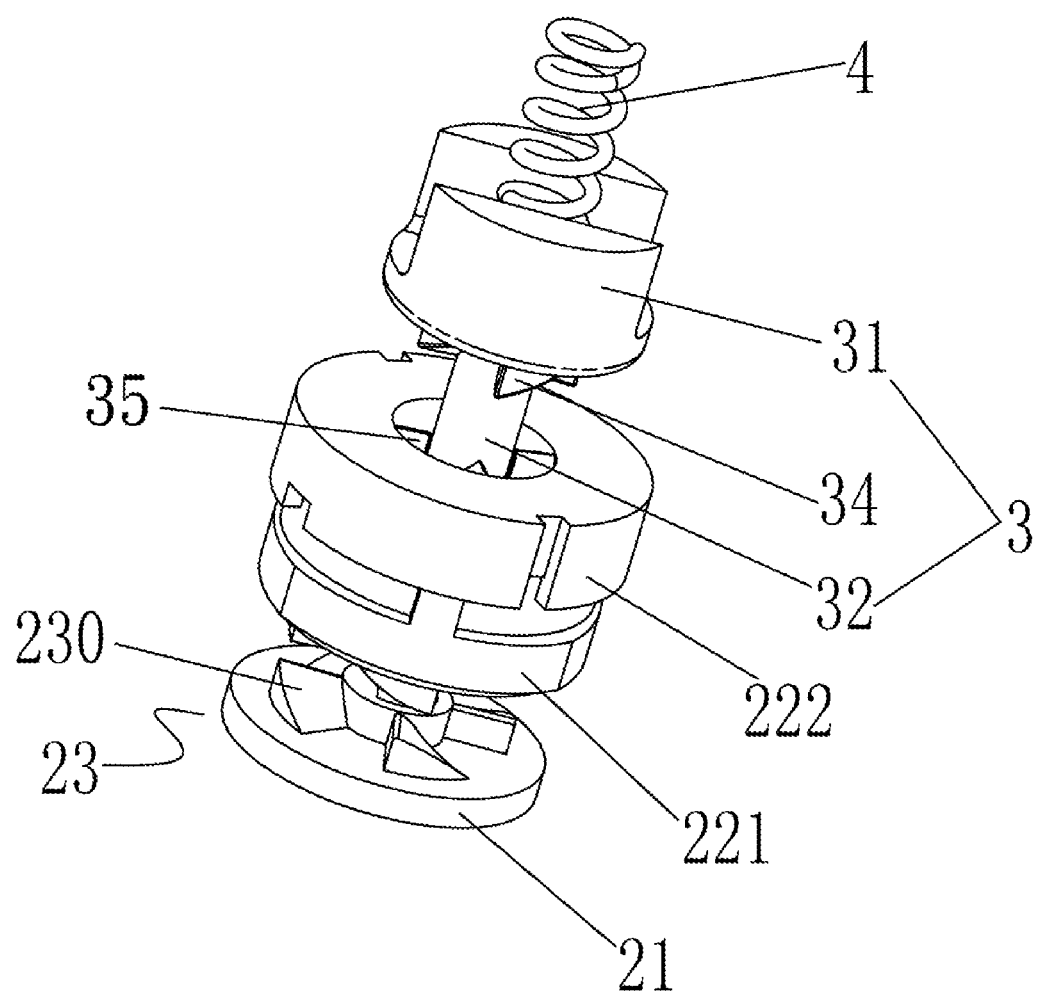
FIG. 2 is a perspective view of the assembled pushbutton valve assembly.
Figure 3:
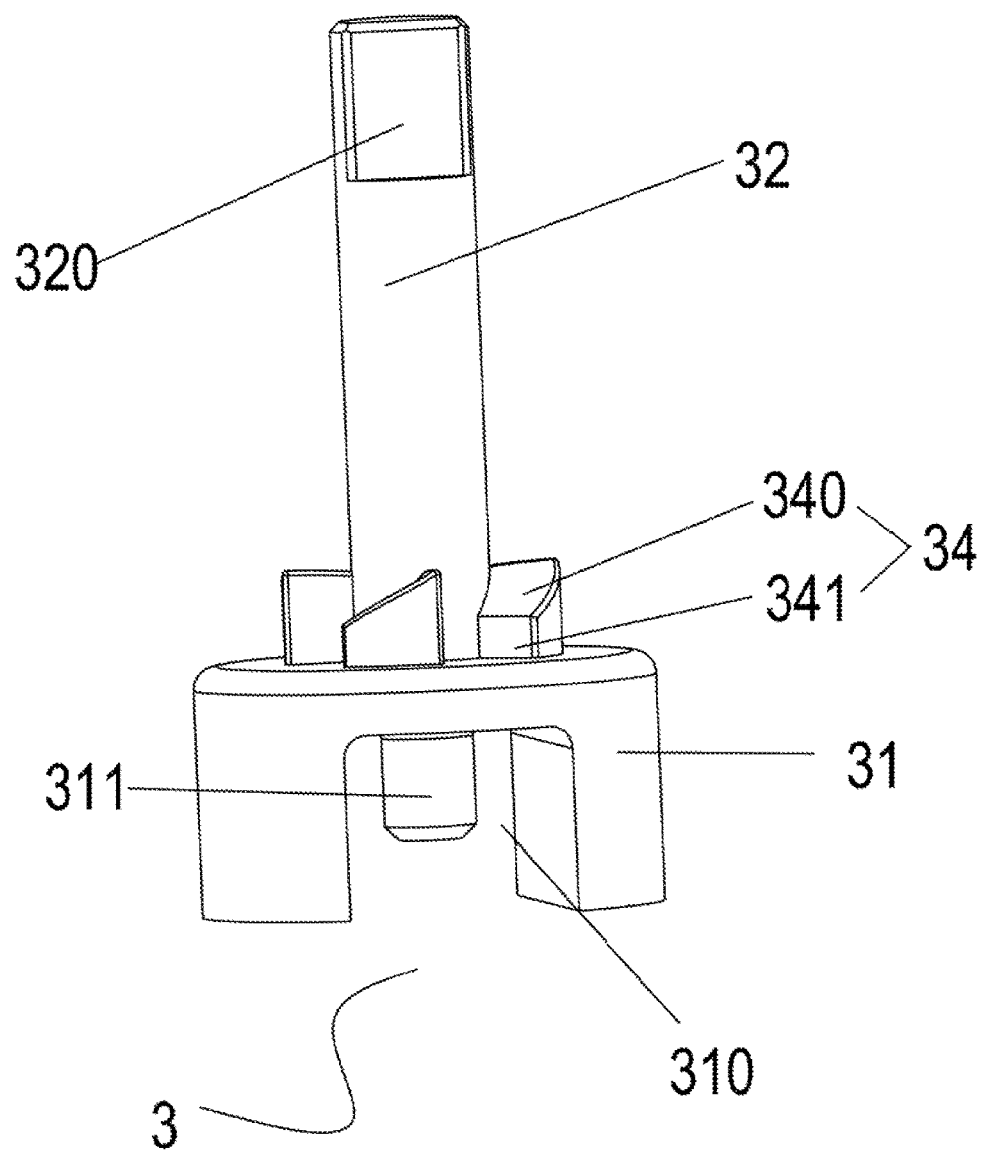
FIG. 3 is a perspective view of the activation assembly.
Figure 4:
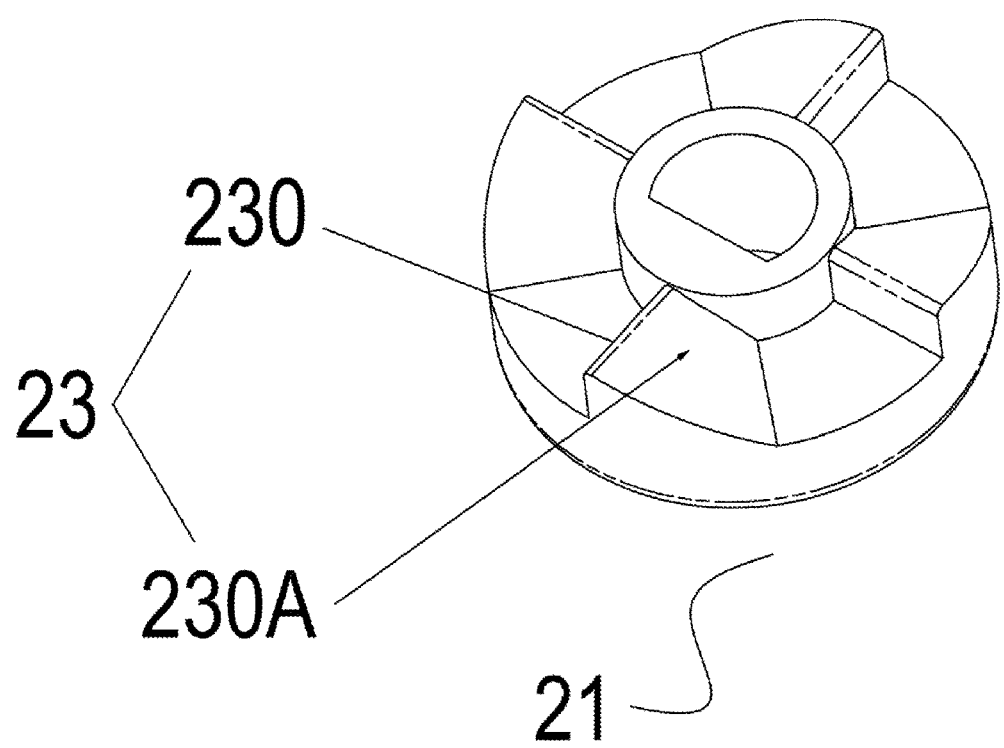
FIG. 4 is a perspective view of the pushbutton.
Figure 5:
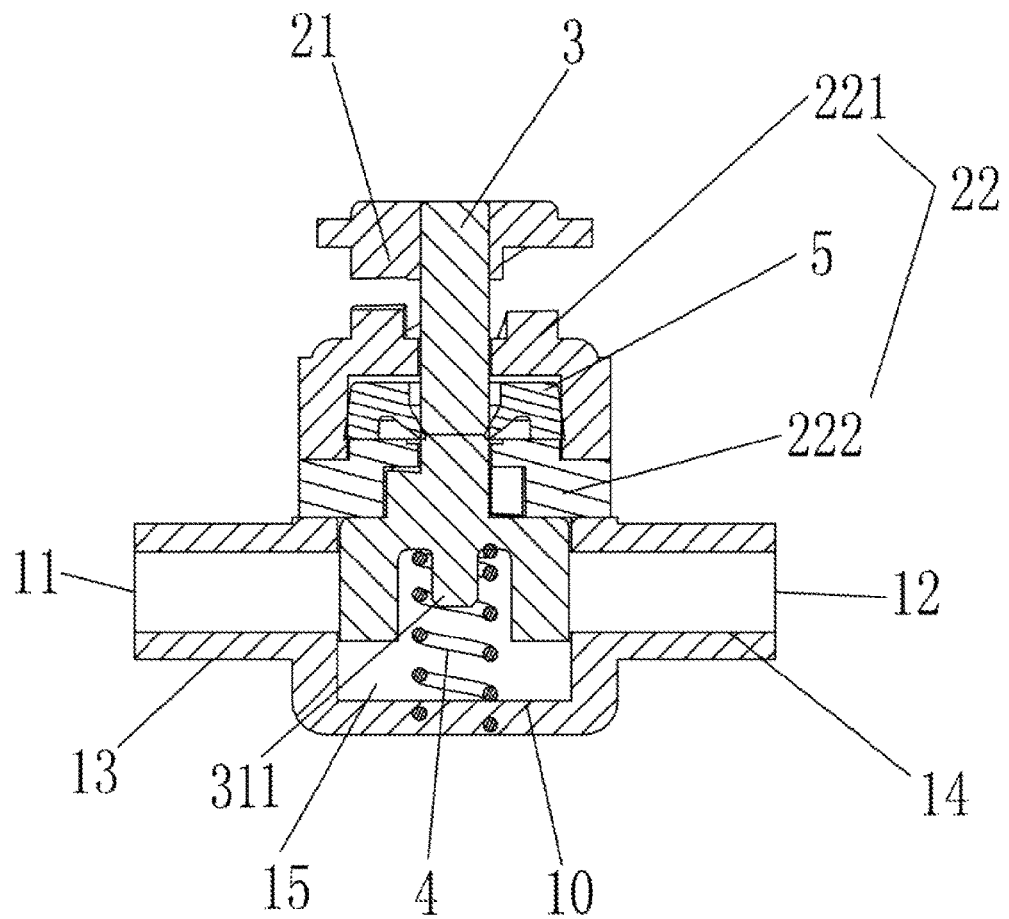
FIG. 5 is a longitudinal sectional view of the pushbutton valve assembly mounted in a water pipe.
Figure 6:
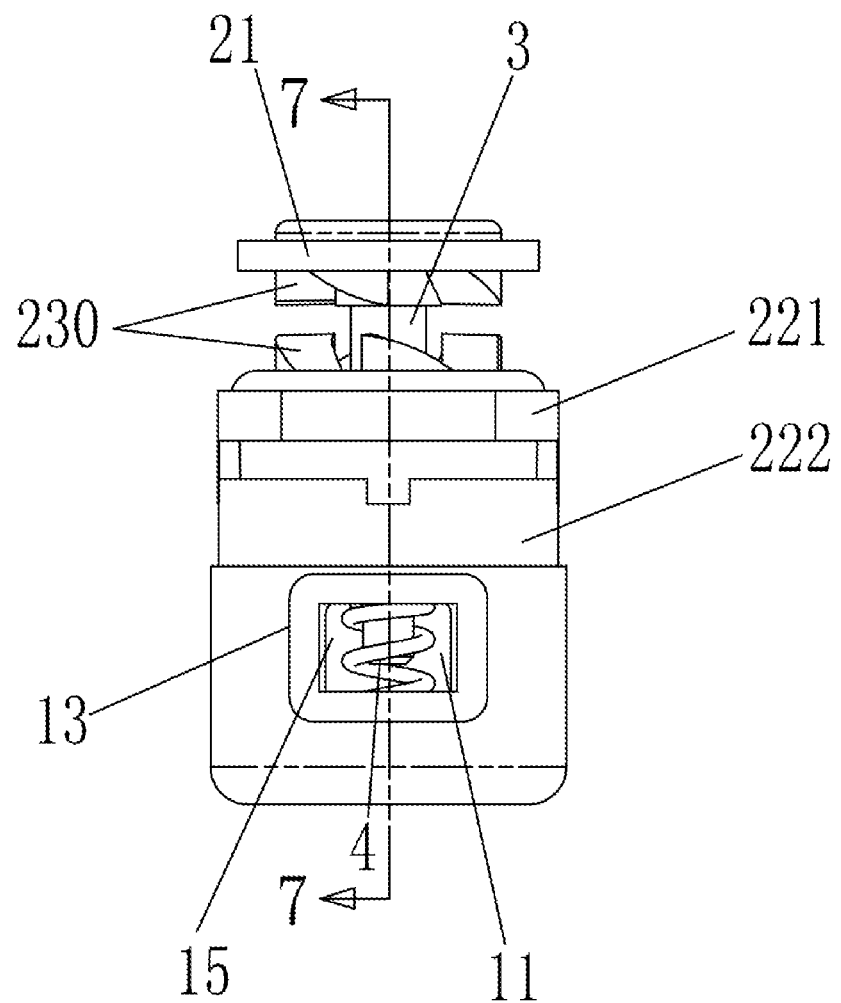
FIG. 6 is a side elevation of the pushbutton valve assembly.
Figure 7:
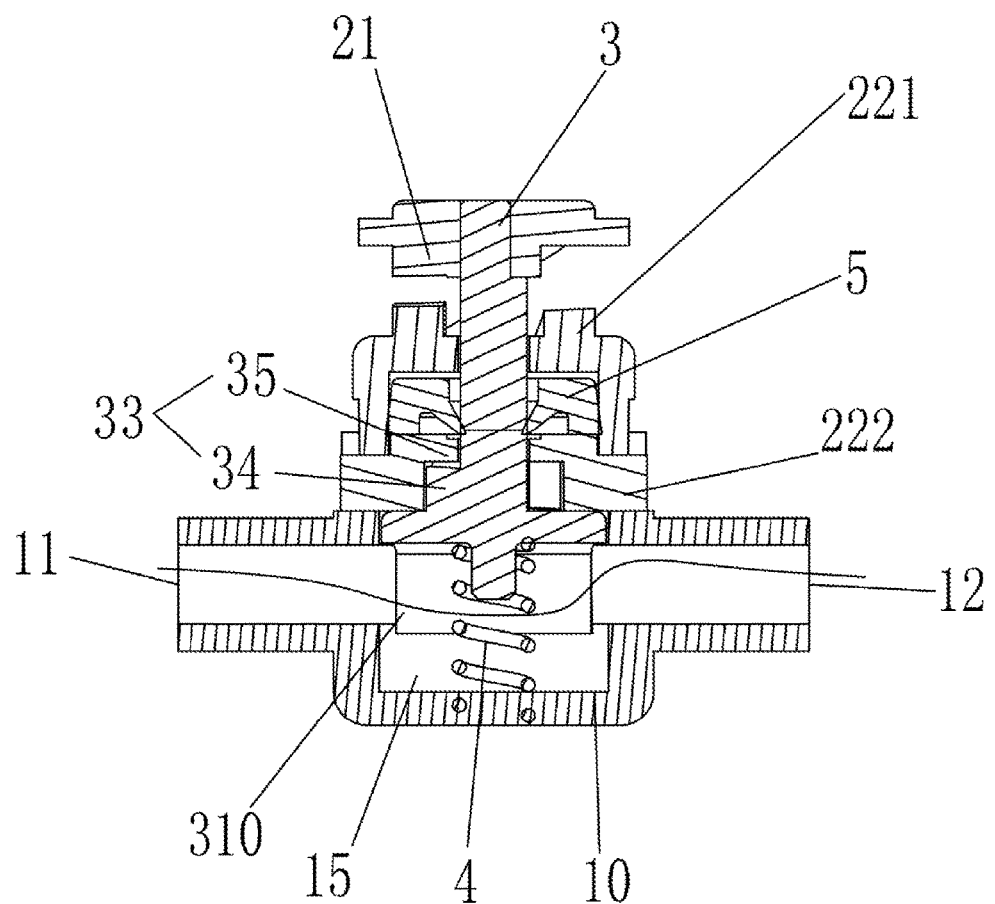
FIG. 7 is a view similar to FIG. 5 showing the valve being open to allow water to flow through the slot.
Figure 8:
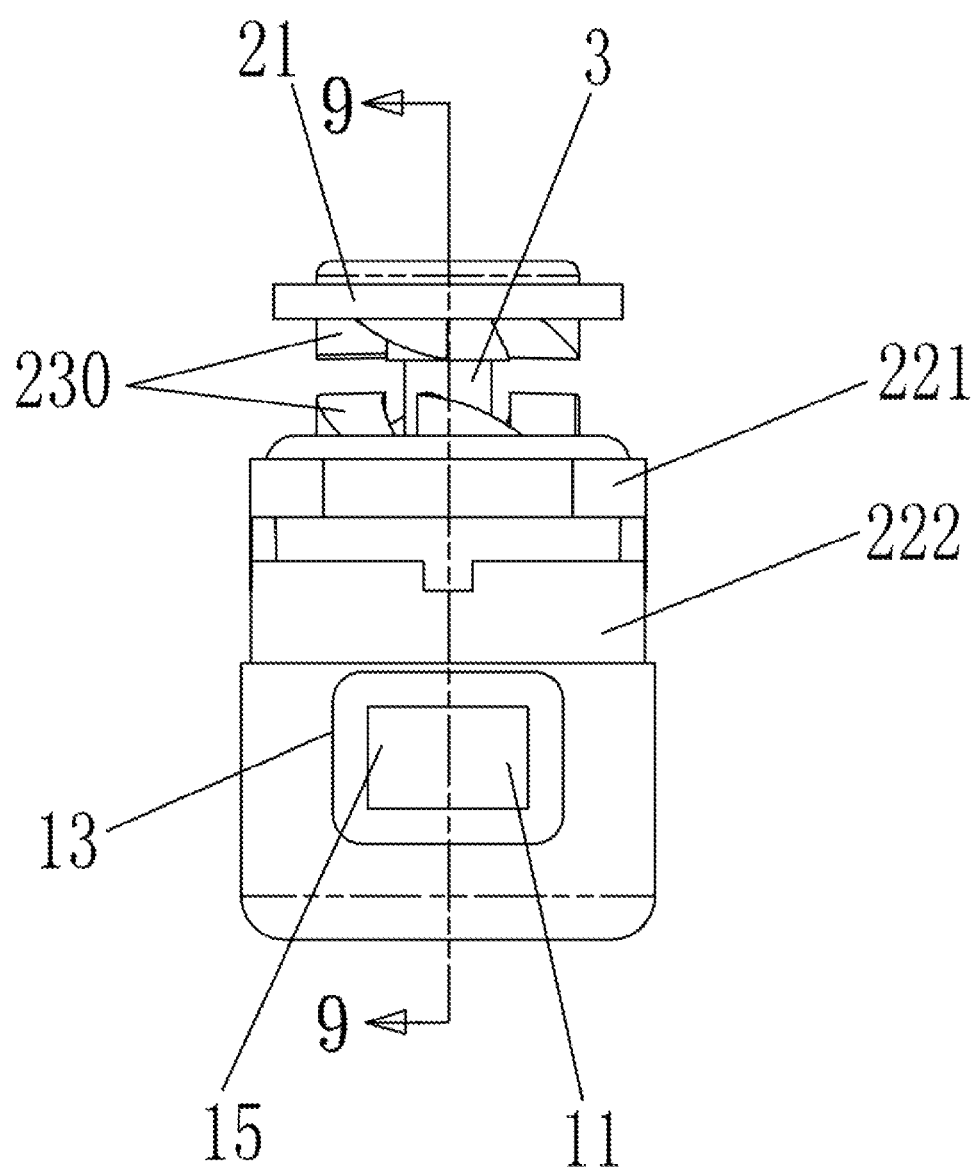
FIG. 8 is another side elevation of the pushbutton valve assembly.
Figure 9:
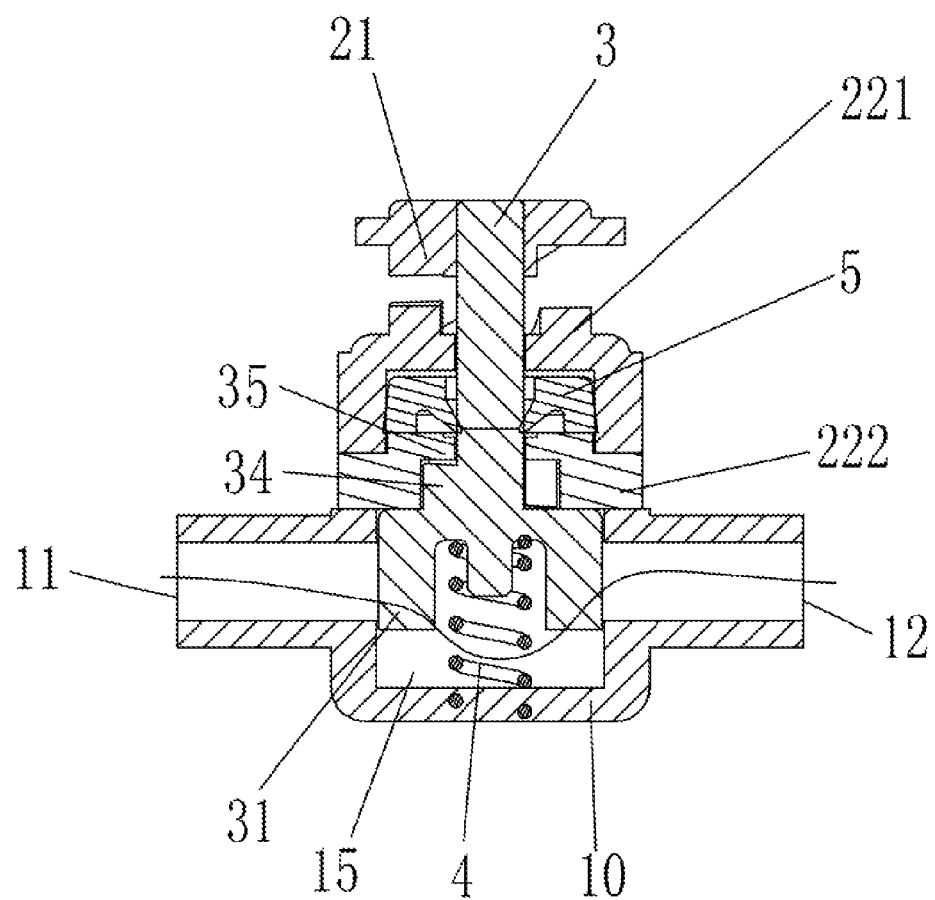
FIG. 9 is a view similar to FIG. 7 showing the valve being open to allow water to flow through a gap between the sealing member and the body.

Referring to FIGS. 1 to 9, a pushbutton valve assembly 1 in accordance with the invention comprises the following components as discussed in detail below.

A body 10 includes an inlet port 13 coupled to an end of a water pipe (not shown) and an outlet port 14 coupled to an end of another water pipe (not shown). Water may from an inlet 11 to an outlet 12 through a space 15 in the body 10 when the valve is open.

A control assembly 2 includes a pushbutton 21, a connection subassembly 22, and two ratcheting subassemblies 23. One ratcheting subassembly 23 on a top surface of an upper ring 221 of the connection subassembly 22 includes four 90-degree spaced apart teeth of a steeply sloped edge 230 and a gently sloped edge 230A. The other ratcheting subassembly 23 on a bottom surface of the pushbutton 21 includes four 90-degree spaced apart teeth of a steeply sloped edge 230 and a gently sloped edge 230A. The two ratcheting subassemblies 23 are in ratcheting engagement. The connection subassembly 22 further includes a lower ring 222 secured to the upper ring 221.

An activation assembly 3 is disposed through the connection subassembly 22 into the space 15. The activation assembly 3 includes a sealing member 31 having a slot 310 on one surface, and a cylinder 311 in the slot 310 and a stem 32 passing through the connection subassembly 22 to have a recess 320 at an upper end secured to the pushbutton 21. A helical spring 4 is put on the cylinder 311 and has a bottom end urging against the body 10.

The activation assembly 3 further includes a gear 34 on the other surface of the sealing member 31. The gear 34 is one of two parts of a ratcheting mechanism 33 and in the lower ring 222 of the connection subassembly 22 and includes four 90-degree spaced apart teeth of a gently sloped edge 340 and a steeply sloped edge 341. A pawl 35 as the other part of the ratcheting mechanism 33 is formed in the lower ring 222 of the connection subassembly 22 and engages the gear 34. A ring 5 having a V-shaped longitudinal section in a central portion is disposed in the upper ring 221 and secured to both the lower ring 222 and the pawl 35.

It is implemented that flow can be large (L), small (S) or off which is the default with the slot 310 being blocked. Further, the flow may follow the sequence of off, S, L, and S repeatedly in the following flow regulation operations.

Flow regulation operations of the invention are discussed in detail below. An individual may press the pushbutton 21 to move the stem 32 downward a predetermined distance and after the steeply sloped edge 230 of the pushbutton 21 contacting the steeply sloped edge 230 of the upper ring 221, the stem 32 continues to move downward and causes the steeply sloped edge 230 of the pushbutton 21 to slide downward over the gently sloped edge 230A of the upper ring 221 until being stopped. At the same time, the spring 4 is compressed and the pawl 35 is disengaged from the steeply sloped edge 341 of the gear 34. The stem 32 (i.e., the pushbutton 21) counterclockwise rotates 22.5-degree.

After the individual releasing the pushbutton 21, the activation assembly 3 (i.e., the pushbutton 21) moves upward due to expansion of the energized spring 4. The steeply sloped edge 341 of the gear 34 contacts the pawl 35 after a predetermined distance of the upward movement. And in turn, the gently sloped edge 340 slides upwardly obliquely while contacting the pawl 35 until the pawl 35 is stopped by the steeply sloped edge 341 of an adjacent tooth. The stem 32 (i.e., the pushbutton 21) counterclockwise rotates another 22.5-degree. The pushbutton 21 disengages from the upper ring 221. That is, a total of 45-degree rotation of the stem 32 by continuously pressing and releasing the pushbutton 21. At this position, flow may pass through a gap between the sealing member 31 and the body 10 in a small mode. Further, all components that had moved are returned to their original positions (i.e., re-positioned).

A next continuous pressing and releasing of the pushbutton 21 may change the flow from the small mode to the large mode by allowing the flow to pass through the slot 310. Another next continuous pressing and releasing of the pushbutton 21 may change the flow from the large mode to the small mode by allowing the flow to pass through the gap between the sealing member 31 and the body 10. A further next continuous pressing and releasing of the pushbutton 21 may change the flow from the small mode to off by completely blocking the flow from passing through both the slot 310 and the gap between the sealing member 31 and the body 10. This completes a cycle of flow change.

The invention has the following advantages: Easy operation of pushbutton. Simple construction. Reliability. Easy control. Stability. Easy installation. Total satisfaction. Meeting customer demand. The activation assembly moves downward after pressing the pushbutton and upward after releasing the pushbutton. Decreased number of components. Decreased resistance of the activation assembly. One hand operation. Large and small flows are available.

While the invention has been described in terms of preferred embodiments, those skilled in the art will recognize that the invention can be practiced with modifications within the spirit and scope of the appended claims.

What is claimed is:

1. A pushbutton valve assembly comprising:
   a body including an inlet, an outlet, and a space between the inlet and the outlet;
   a control assembly including a pushbutton, a connection subassembly, and two ratcheting subassemblies;
   an activation assembly having a first end secured to the pushbutton, the activation assembly disposed through the connection subassembly to have a second end disposed in the space, and the activation assembly including a ratcheting mechanism; and
   a biasing member anchored between the body and the activation assembly;
   wherein a pressing of the pushbutton moves down the activation assembly to cause the ratcheting subassemblies to apply a ratcheting action in a downward direction, thereby rotating the activation assembly a first angle, causing the ratcheting mechanism to apply a ratcheting action in the downward direction, and compressing the biasing member; and
   wherein a releasing of the pushbutton moves up the activation assembly and rotates the activation assembly a second angle by expanding the biasing member, thereby re-positioning the activation assembly and the control assembly, and increasing or decreasing flow passing through the activation assembly.

2. The pushbutton valve assembly of claim 1, wherein one ratcheting subassembly is formed on the pushbutton, the other ratcheting subassembly is formed on the connection subassembly, and each ratcheting subassembly includes a plurality of spaced apart teeth of a steeply sloped edge and a gently sloped edge.

3. The pushbutton valve assembly of claim 1, wherein the ratcheting mechanism includes a gear disposed in a lower ring of the connection subassembly, the gear including a plurality of spaced apart teeth of a gently sloped edge and a steeply sloped edge, and a pawl disposed in the lower ring of the connection subassembly and engaging the gear.

4. The pushbutton valve assembly of claim 3, wherein the activation assembly further comprises a sealing member in the space, and a stem passing through the connection subassembly, the stem having a recess at an end secured to the pushbutton, and wherein the steeply sloped edges of the gear are formed on the stem.

5. The pushbutton valve assembly of claim 4, wherein the sealing member includes a slot so that a ratcheting action is applied to both the steeply sloped edges of the gear and the pawl in response to the downward movement of the activation assembly, thereby selectively aligning the slot with both the inlet and outlet.

6. The pushbutton valve assembly of claim 5, wherein the sealing member further comprises a cylinder in the slot for anchoring the biasing member.

7. The pushbutton valve assembly of claim 1, wherein the connection subassembly includes a lower ring and an upper ring secured to the lower ring, the other ratcheting subassembly is formed on the upper ring, and the pawl is disposed in the lower ring.

8. The pushbutton valve assembly of claim 1, wherein the body further comprises an inlet port formed with the inlet and an outlet port formed with the outlet, and the activation assembly has the second end disposed in the space so that the flow is configured to flow from the inlet to the outlet through the inlet port, the space, and the outlet port.

* * * * *